United States Patent
Lee

(10) Patent No.: US 8,336,909 B2
(45) Date of Patent: Dec. 25, 2012

(54) REAR AIRBAG SYSTEM HAVING ADVANCED SAFETY PERFORMANCE

(75) Inventor: Seung Woo Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 135 days.

(21) Appl. No.: 12/957,150

(22) Filed: Nov. 30, 2010

(65) Prior Publication Data

US 2012/0049493 A1 Mar. 1, 2012

(30) Foreign Application Priority Data

Aug. 31, 2010 (KR) .................. 10-2010-0084671

(51) Int. Cl.
*B60R 21/207* (2006.01)
(52) U.S. Cl. ................. 280/730.1; 297/216.12
(58) Field of Classification Search ............... 280/730.1, 280/730.2, 735, 748, 753; 297/216.12
See application file for complete search history.

(56) References Cited

U.S. PATENT DOCUMENTS

| | | | | |
|---|---|---|---|---|
| 3,420,572 A * | 1/1969 | Theodore | 180/271 |
| 3,510,150 A * | 5/1970 | Wilfert | 280/733 |
| 3,799,577 A * | 3/1974 | Colucci | 297/478 |
| 4,865,388 A * | 9/1989 | Nemoto | 297/403 |
| 5,056,816 A * | 10/1991 | Lutze et al. | 280/751 |
| 5,458,396 A * | 10/1995 | Rost | 297/216.12 |
| 5,505,487 A * | 4/1996 | Brown et al. | 280/730.1 |
| 6,030,036 A * | 2/2000 | Fohl | 297/216.14 |
| 6,095,550 A * | 8/2000 | O'Loughlin et al. | 280/730.1 |
| 6,196,579 B1 * | 3/2001 | Bowers et al. | 280/735 |
| 6,199,900 B1 * | 3/2001 | Zeigler | 280/735 |
| 6,511,095 B1 * | 1/2003 | Kober et al. | 280/756 |
| 6,572,137 B2 * | 6/2003 | Bossecker et al. | 280/730.1 |
| 7,364,185 B2 * | 4/2008 | Mori et al. | 280/730.1 |
| 7,690,684 B2 * | 4/2010 | Tobaru et al. | 280/756 |
| 7,695,015 B2 * | 4/2010 | Breed | 280/751 |
| 7,878,530 B2 * | 2/2011 | Mizuno et al. | 280/730.1 |

* cited by examiner

*Primary Examiner* — Paul N Dickson
*Assistant Examiner* — George Spisich
(74) *Attorney, Agent, or Firm* — Morgan, Lewis & Bockius LLP

(57) ABSTRACT

A rear airbag system includes a rear-end collision sensor (10) installed on one side of a car body to sense the rear-end collision, a controller (20) outputting a control signal when an electrical signal input from the rear-end collision sensor (10) exceeds a reference value, a rear seat airbag module (100) mounted in a seat (30) and inflated to protrude upwards from the seat (30) so as to protect a rear head part of an occupant when receiving the control signal from the controller (20), and a support unit (200) sliding upwards along with the rear seat airbag module (100) when the rear seat airbag module (100) is inflated upwards out of the seat (30), supporting a rear of the rear seat airbag module (100), and protecting a head of the occupant from flying materials occurring in the event of the rear-end collision.

6 Claims, 5 Drawing Sheets

REAR AIRBAG SYSTEM HAVING ADVANCED SAFETY PERFORMANCE

CROSS-REFERENCE TO RELATED APPLICATIONS

The present application claims priority to Korean Patent Application No. Number 10-2010-0084671 filed on Aug. 31, 2010, the entire contents of which is incorporated herein for all purposes by this reference.

BACKGROUND OF THE INVENTION

1. Field of the Invention

The present invention relates, in general, to a rear airbag system, which supports a rear airbag to enhance protection of an occupant in the event of a rear-end collision, and allows a support unit to protrude upwards from a seat in response to inflation of the rear airbag to protect the occupant from flying materials such as fragments of glass occurring in the event of the rear-end collision.

2. Description of Related Art

When a rear-end collision occurs involving a car, the neck, head, or shoulder of an occupant of the car hits a seat back or a head rest, so that the occupant is apt to be injured.

One of safety devices provided for rear-end car collisions is an active head rest for preventing injury to the neck part of the occupant by varying the position of the head rest of a seat.

The active head rest for the car pushes up the head rest when the upper body of the occupant is pulled back by the rear-end collision, thereby resisting the instantaneous backward motion of the neck of the occupant. As a result, the active head rest serves to prevent injury to the neck.

Meanwhile, as another safety device provided for rear-end car collisions, a rear airbag has been developed. This rear airbag is used merely to mount a curtain airbag used for the sides of the car on a rear roof. In the event of a rear-end collision, the airbag deploys from the roof to the rear, thereby mitigating impact against the rear head of the occupant, and protecting the occupant from flying materials such as fragments of glass occurring at that time.

However, the active head rest and the rear airbag, both of which are conventional safety devices associated with the rear-end collision as described above, fail to effectively protect the upper body of the occupant such as the head, neck, or shoulder in the event of the car being in a rear-end collision. An impact is transmitted differently to the head, neck, or shoulder depending on the posture and height of the occupant who is sitting in the seat, so that it is impossible to effectively protect the upper body of the occupant.

In particular, since the conventional airbag is configured so that one end thereof is merely suspended on the roof of the car, it is not stably mounted, and is displaced when the occupant applies an external force in the event of the rear-end collision, so that it is impossible to fully protect the occupant.

Further, since the conventional rear airbag may be damaged by flying materials such as fragments of glass when the rear-end collision occurs, it is impossible to safely protect the occupant from those same flying materials. Furthermore, there is no guide for accurately guiding the airbag between a rear windshield and a head rest when the airbag is deployed, so that the airbag has a very low possibility of being deployed in place.

The information disclosed in this Background of the Invention section is only for enhancement of understanding of the general background of the invention and should not be taken as an acknowledgment or any form of suggestion that this information forms the prior art already known to a person skilled in the art.

BRIEF SUMMARY OF THE INVENTION

Various aspects of the present invention are directed to provide a rear airbag system, which stably supports a rear airbag, which is deployed in the event of a rear-end collision, to maximize an effect of protecting an occupant, and which prevents the rear airbag from being damaged by flying materials such as fragments of glass occurring in the event of the rear-end collision and safely protects the occupant from the flying materials.

According to one aspect of the present invention, the rear airbag system having advanced safety performance may include a rear-end collision sensor installed on a side of a car body to sense a rear-end collision, a controller outputting a control signal when an electrical signal input from the rear-end collision sensor exceeds a reference value, a seat airbag module which may be mounted in a seat and an airbag cushion of the seat airbag module may be inflated to protrude upwards from the seat so as to protect a rear head part of an occupant when the seat airbag module receives the control signal from the controller to activate the airbag cushion, and a support unit connected to the airbag cushion of the seat airbag module and sliding upwards with the airbag cushion while the airbag cushion may be inflated upwards out of the seat in other to support a rear portion of the airbag cushion such that a head of the occupant may be protected from flying materials occurring in the event of the rear-end collision.

The seat airbag module may include a hollow housing installed in the seat, an inflator installed on a side of an interior surface of the housing and generating gas when the inflator receives the control signal from the controller, and the airbag cushion which may be held in the housing and inflates upwards along the interior surface of the housing out of the seat when supplied with the gas from the inflator.

The inflator may be disposed on a lower portion of the housing, and the airbag cushion may be disposed on an upper portion of the inflator in the housing so as to cooperate with the inflator.

The support unit includes a hollow case located in a rear side of the housing and disposed in the seat along a vertical direction thereof, wherein the case includes a guide opening, and a plate which may be slidably inserted into the case, may be connected to the airbag cushion through the guide opening, wherein the plate protrudes upwards from the seat with the airbag cushion when the airbag cushion may be inflated to protrude upwards from the seat, and supports a portion of the airbag cushion.

The plate may be coupled with a rear surface of the airbag cushion by sewing parts through the guide opening.

The airbag cushion includes a recess corresponding to a head rest so as not to interfere with the head rest while the airbag cushion may be inflated, and protrudes so as to be higher than the head rest.

The seat includes an opening formed in an upper portion thereof and connected to an upper portion of the housing.

A portion of the airbag cushion may be mounted in the opening such that the airbag cushion may be smoothly inflated through the opening.

The plate may have a cover at an upper end thereof which closes the opening while the plate may be retracted downward.

According to the present invention, since the plate may be coupled with the rear surface of the airbag cushion and supports the rear of the airbag cushion, it may be possible to stably protect the rear head part of the occupant in the event of a rear-end collision, and to prevent the flying materials such as fragments of glass from moving toward the head of the occupant, particularly to protect the airbag cushion from being damaged by sharp flying materials.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
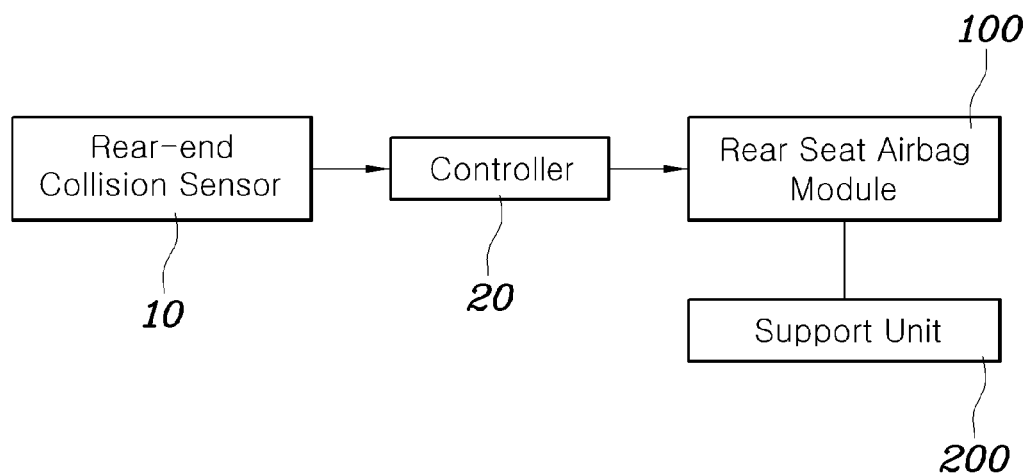
FIG. 1 is a block diagram illustrating the control structure of a rear airbag system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
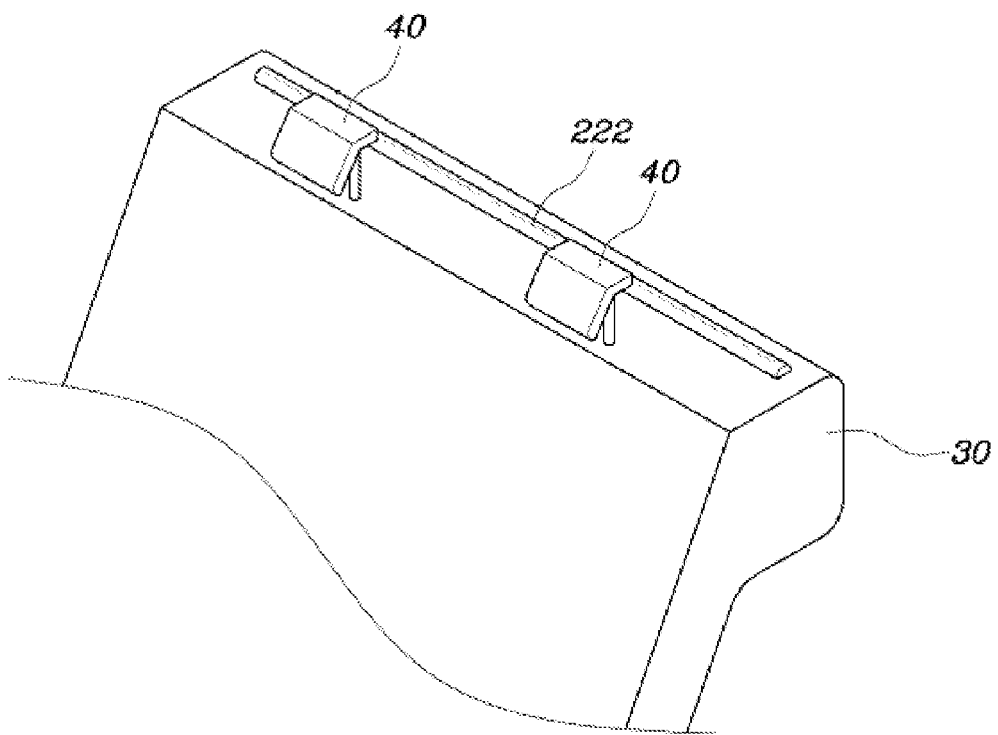
FIG. 2 is a perspective view illustrating the state of a seat before a rear airbag system according to an exemplary embodiment of the present invention is triggered.
Figure 3:
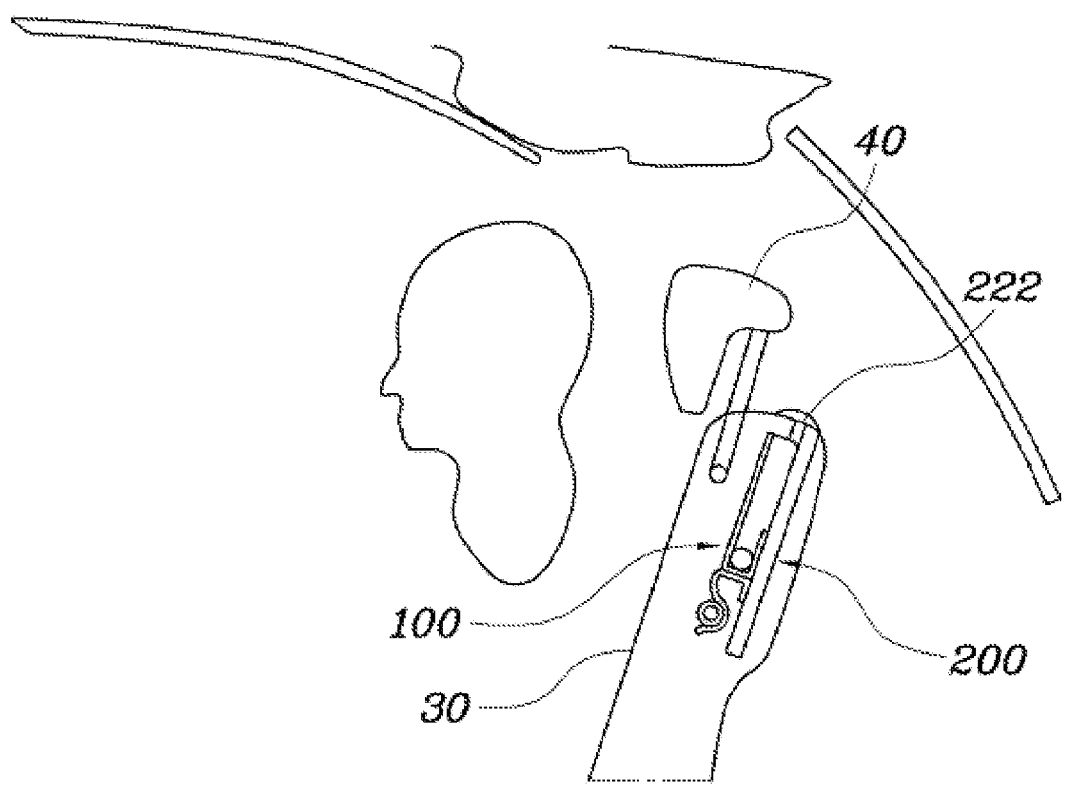
FIG. 3 is a side view illustrating the state before a rear airbag system according to an exemplary embodiment of the present invention is triggered.

Referring to FIGS. 1 to 3, a rear airbag system as an exemplary embodiment of the present invention generally includes a rear-end collision sensor 10, a controller 20, a rear seat airbag module 100, and a support unit 200.

The rear-end collision sensor 10 is provided on one side of the body of a car to sense a rear-end collision involving the car. When impact energy is applied to the rear of the car as in a rear-end collision, the rear-end collision sensor 10 senses it and outputs an electrical signal corresponding to the impact energy. The rear-end collision sensor 10 is well known in the related art, and so a detailed description thereof will be omitted.

The controller 20 receives the electrical signal output from the rear-end collision sensor 10, and compares a value of the electrical signal with a reference value stored therein. When the value of the input electrical signal is greater than the reference value, the controller 20 outputs a predetermined control signal that triggers the rear seat airbag module 100.

The reference value of the controller 20 must be set in consideration of a value, using which the impact energy applied to the rear of the car that injures an occupant is calculated. The reference value may be set properly by a person skilled in the art. If the value of the electrical signal of the rear-end collision sensor 10 is greater than the reference value set for the controller 20, the controller 20 outputs a control signal to the rear seat airbag module 100, thereby causing the rear airbag to be triggered.

As illustrated in FIG. 3, the rear seat airbag module 100 is mounted in a seat 30 of the car. When receiving the control signal of the controller 20 in the event of the rear-end collision, the rear seat airbag module 100 is inflated to protrude upwards from the seat 30, thereby protecting the rear head part of the occupant which abruptly moves toward the rear of the car.

Figure 5:
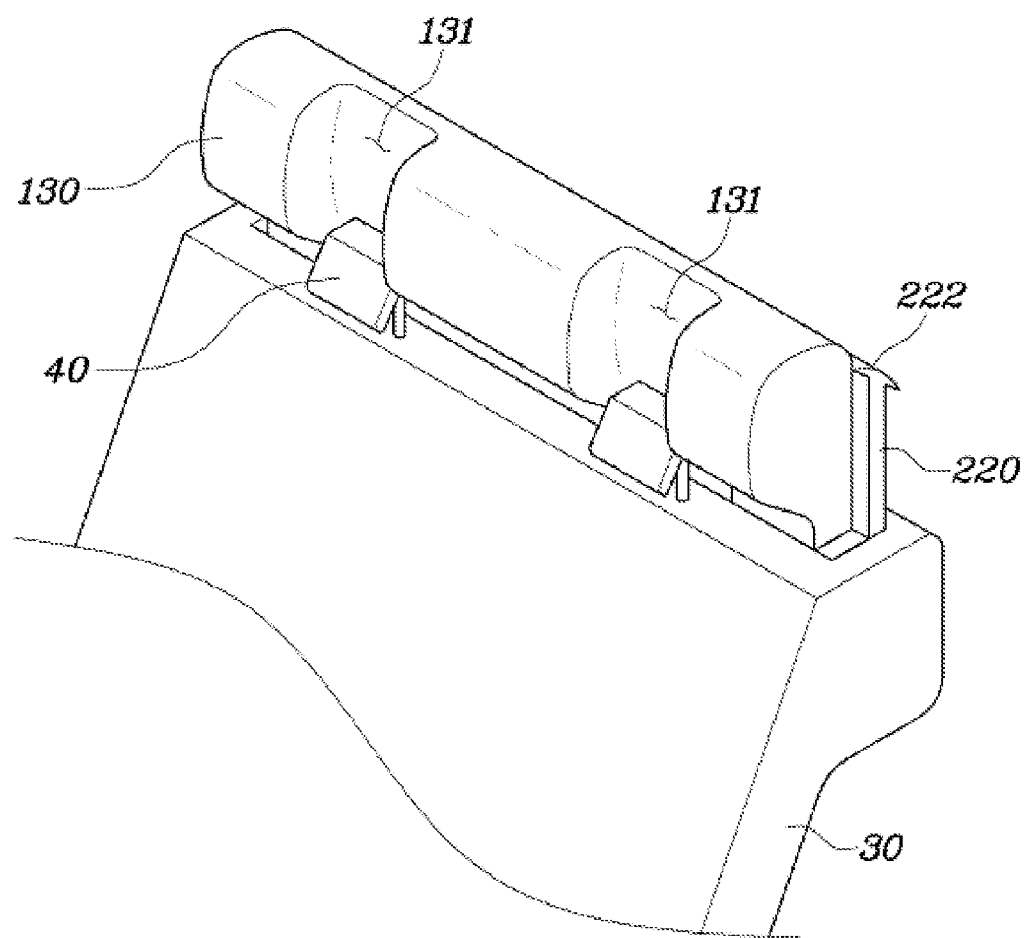
FIG. 5 is a perspective view illustrating the state of a seat after a rear airbag system according to an exemplary embodiment of the present invention is triggered.
Figure 6:
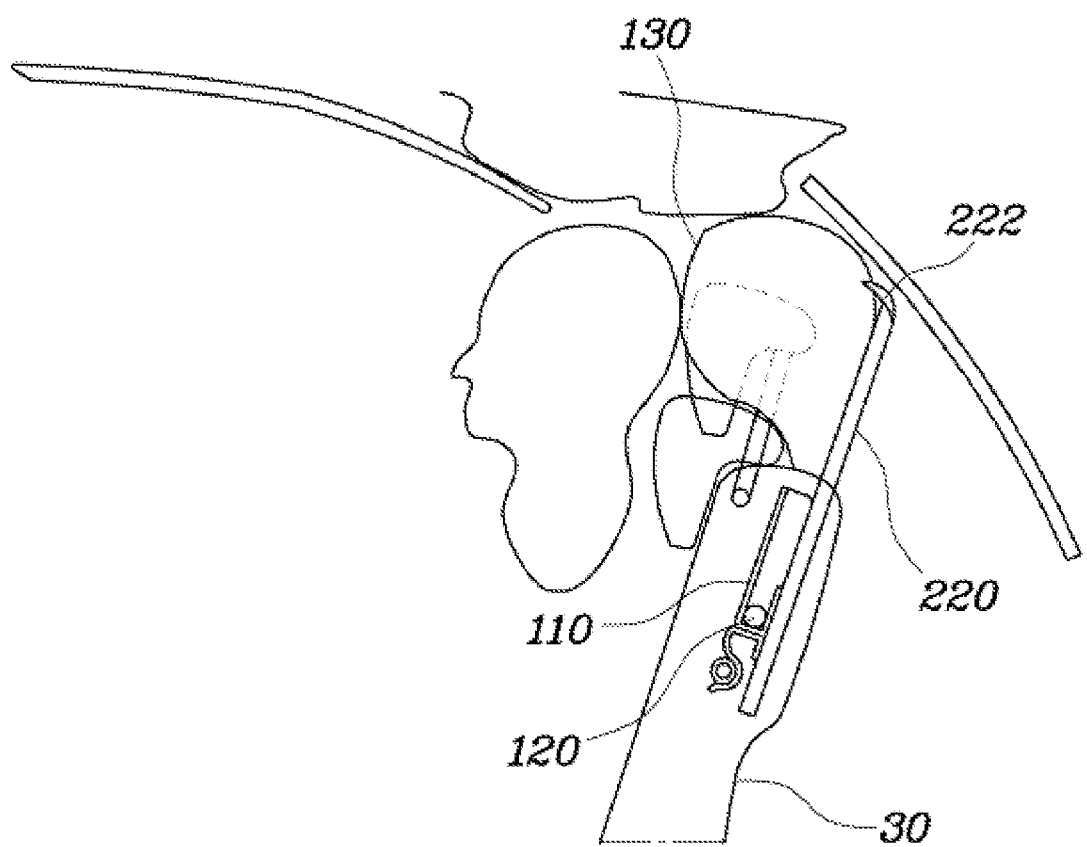
FIG. 6 is a side view illustrating the state after a rear airbag system according to an exemplary embodiment of the present invention is triggered.

As illustrated in FIG. 2, the rear seat airbag module 100 is not normally visible from the outside because it is mounted in the seat 30. However, as illustrated in FIGS. 5 and 6, when a rear-end collision occurs, the rear seat airbag module 100 is inflated to protrude upwards from the seat 30, thereby protecting the head of the occupant.

Figure 4:
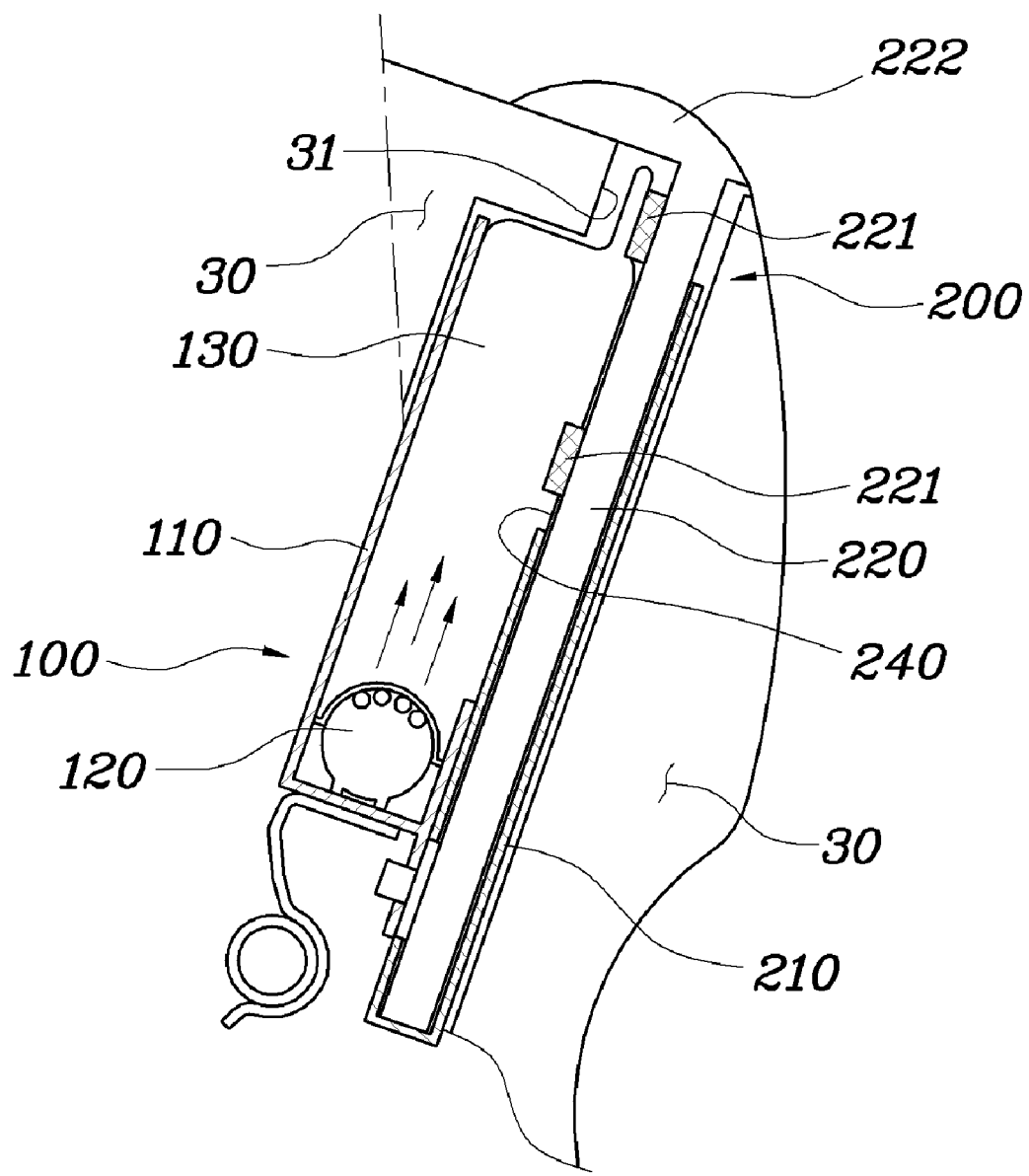
FIG. 4 illustrates configuration of a rear airbag system according to an exemplary embodiment of the present invention is triggered.

As illustrated in an enlarged view of FIG. 4, the rear seat airbag module 100 generally includes a housing 110, an inflator 120, and an airbag cushion 130.

The housing 110 is installed in the seat 30, and is provided therein with a holding space of a predetermined size. The housing 110 is open at an upper portion thereof. The upper portion of the housing 110 is covered by the seat 30. The seat 30 is provided with an opening 31 at an upper portion thereof in a widthwise direction such that the airbag cushion 130 can protrude upwards from the seat 30 when inflated.

The inflator 120 and the airbag cushion 130 are installed in the holding space of the housing 110. The inflator 120 is provided so as to be located on one side of the interior of the housing 110, preferably on a lower side of the housing 110, and generates gas when receiving the control signal from the controller 20. The inflator 120 is typically used for airbags, and so a detailed description thereof will be omitted.

Further, the airbag cushion 130 is configured to be mounted in the holding space of the housing 110 and to inflate upwards out of the seat 30 when supplied with the gas from the inflator 120. Thus, the airbag cushion 130 must be disposed so as to cooperate with the inflator 120 in the holding space of the housing 110. As illustrated in FIG. 4, the airbag cushion 130 may be disposed above the inflator 120.

Thus, when the inflator 120 is exploded to generate gas in response to the control signal of the controller 20, the airbag cushion 130 is supplied with the gas, and inflates upwards. The airbag cushion 130 protrudes upwards from the seat 30 via the opening 31 formed in the upper portion of the seat 30, and then is spread upwards in the rear of the head rest 40 as illustrated in FIGS. 5 and 6.

Here, the airbag cushion 130 may be spread beyond the height of the head rest 40 so as to be able to protect the rear head part of the occupant in a stable and complete way. Further, the airbag cushion 130 may be provided with a recess 131 corresponding to the head rest 40 so as not to interfere with the head rest 40 when the airbag cushion 130 is completely inflated.

In detail, the airbag cushion 130 is deployed in a shape as illustrated in FIG. 5. Since the recess 131 is formed in a portion where the airbag cushion 130 may interfere with the head rest 40 when inflated upwards out of the seat 30, the airbag cushion 130 can be smoothly deployed without being hindered by the head rest 40. The airbag cushion 130 protrudes higher than the head rest 40, so that the airbag cushion 130 can stably support the rear head part of the occupant.

Particularly, the airbag cushion 130 effectively protects the occupant who is sitting in the seat between the head rests 40, and thus the airbag cushion 130 mitigates the injury to the occupant in the event of a rear-end collision.

Meanwhile, the support unit 200 is configured to be raised along with the rear seat airbag module 100 when the rear seat airbag module 100 is inflated and protrudes upwards from the seat 30. The support unit 200 serves to stably support the rear of the protruding rear seat airbag module 100 and to protect the head of the occupant from flying materials such as the fragments of glass occurring in the event of a collision.

In detail, if the airbag cushion 130 is inflated inside the housing 110 and then simply protrudes upwards from the seat 30, the rear head part of the occupant is neither properly supported nor stably protected when colliding with the airbag cushion 130, because only the lower portion of the airbag cushion 130 is connected to the seat 30.

Thus, if the support unit 200 is raised together to support the rear of the airbag cushion 130 when the airbag cushion 130 protrudes upwards from the seat 30, the support unit 200 can stably support the airbag cushion 130 without the airbag cushion 130 being pushed backwards even when the head of the occupant collides with the airbag cushion 130.

Here, the support unit 200 includes a case 210 and a plate 220 as well illustrated in FIG. 4.

The case 210 is located in the rear of the housing 110 in the seat 30, and is provided with a guide passage that goes in a vertical direction.

Further, the plate 220 is inserted into the case 210 so as to move up and down, and is coupled with the airbag cushion 130 so as to be able to protrude upwards from the seat 30 along with the airbag cushion 130 when the airbag cushion 130 is inflated to protrude upwards from the seat 30.

Here, the case 210 may include a guide opening 240 and the plate 220 may be coupled with a rear surface of the airbag cushion 130 by sewing parts 221 through the guide opening 240. In this way, when the plate 220 is integrally coupled with the airbag cushion 130, the plate 220 is drawn out along with the airbag cushion 130 when the airbag cushion 130 is inflated to protrude upwards from the seat 30, and thus supports the rear of the airbag cushion 130.

In the case of the plate 220 coupled with the rear surface of the airbag cushion 130 and supporting the rear of the airbag cushion 130, it is possible to stably protect the rear head part of the occupant, and to prevent flying materials such as the fragments of glass from moving towards the head of the occupant, particularly to protect the airbag cushion 130 from being damaged by sharp flying materials, in the event of a rear-end collision.

Further, a cover 222 may be formed in an upper end of the plate 220 so as to close the opening 31 formed in the upper portion of the seat 30. The cover 222 closes the opening 31 of the upper portion of the seat 30 before the airbag cushion 130 is deployed, thereby preventing the opening 31 of the upper portion of the seat 30 from normally being visible from the outside.

For convenience in explanation and accurate definition in the appended claims, the terms "upper", "lower", "inner", "outer" and "upwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear airbag system having advanced safety performance comprising:
   a rear-end collision sensor installed on a side of a car body to sense a rear-end collision;
   a controller outputting a control signal when an electrical signal input from the rear-end collision sensor exceeds a reference value;
   a seat airbag module which is mounted in a seat and an airbag cushion of the seat airbag module is inflated to protrude upwards from the seat so as to protect a rear head part of an occupant when the seat airbag module receives the control signal from the controller to activate the airbag cushion; and
   a support unit connected to the airbag cushion of the seat airbag module,
   wherein the seat airbag module includes:
   a hollow housing installed in the seat;
   an inflator installed on a side of an interior surface of the housing and generating gas when the inflator receives the control signal from the controller; and
   the airbag cushion which is held in the housing and inflates upwards along the interior surface of the housing out of the seat when supplied with the gas from the inflator,
   wherein the support unit includes:
   a hollow case located in a rear side of the housing and disposed in the seat along a vertical direction thereof, wherein the case includes a guide opening; and
   a plate which is slidably inserted into the case, is connected to the airbag cushion through the guide opening, wherein the plate protrudes upwards from the seat with the airbag cushion when the airbag cushion is inflated to protrude upwards from the seat, and supports a portion of the airbag cushion, and
   wherein the plate is coupled with a rear surface of the airbag cushion by sewing parts of the airbag to the plate through the guide opening.

2. The rear airbag system as set forth in claim 1, wherein the inflator is disposed on a lower portion of the housing, and the airbag cushion is disposed on an upper portion of the inflator in the housing so as to cooperate with the inflator.

3. The rear airbag system as set forth in claim 1, wherein the airbag cushion includes a recess corresponding to a head rest so as not to interfere with the head rest while the airbag cushion is inflated, and protrudes so as to be higher than the head rest.

4. The rear airbag system as set forth in claim 1, wherein an opening is positioned in an upper portion of the seat and connected to an upper portion of the housing.

5. The rear airbag system as set forth in claim 4, wherein a portion of the airbag cushion is mounted in the opening such that the airbag cushion is smoothly inflated through the opening.

6. The rear airbag system as set forth in claim 4, wherein the plate has a cover at an upper end thereof which closes the opening while the plate is retracted downward.

* * * * *